United States Patent [19]

Park

[11] 4,264,757
[45] Apr. 28, 1981

[54] RADIATION-CURABLE ALLYL- OR VINYL CAPPED POLYCAPROLACTONE COMPOSITIONS

[75] Inventor: Kisoon Park, Charleston, W. Va.

[73] Assignee: Union Carbide Corporation, New York, N.Y.

[21] Appl. No.: 52,193

[22] Filed: Jun. 26, 1979

[51] Int. Cl.³ .................... C08G 18/81; C08G 18/76; C08G 18/67
[52] U.S. Cl. .................................. 528/75; 204/159.19
[58] Field of Search ...................... 528/75; 204/159.19

[56] References Cited

U.S. PATENT DOCUMENTS

| | | | |
|---|---|---|---|
| Re. 29,131 | 2/1977 | Smith et al. | 204/159.19 |
| 3,651,021 | 3/1972 | Kincaid et al. | 528/75 |
| 3,654,347 | 4/1972 | Kincaid et al. | 528/75 |
| 4,156,066 | 5/1979 | Gould | 204/159.19 |
| 4,188,472 | 2/1980 | Chang | 528/75 |

*Primary Examiner*—V. P. Hoke
*Attorney, Agent, or Firm*—Stanley Ktorides

[57] ABSTRACT

Allyl- or vinyl-capped polycaprolactone polyol derivatives are produced by the reaction of a polycaprolactone polyol, an allyl or vinyl monomer and a polyisocyanate. These novel derivatives can be used to produce novel coating compositions that are readily cured to solid protective films.

4 Claims, No Drawings

RADIATION-CURABLE ALLYL- OR VINYL CAPPED POLYCAPROLACTONE COMPOSITIONS

BACKGROUND OF THE INVENTION

Coatings play a useful role in the manufacture and use of a great many article which find use in all facets of contemporary life. Until recently, nearly all coatings were applied with the employment of a hydrocarbon based vehicle which evaporated leaving the dried coating on the article coated. This system is meeting with increasing disfavor as the prices of organic solvents continue to increase at rapid rates and as the deleterious environmental effects of the evaporated solvents become better understood. In response, those skilled in the art have endeavored to devise systems of coatings which minimized or avoided use of organic solvents as vehicles. One of the most successful of these systems has been the so-called 100 percent solids coatings compositions, which are in essence reactive compositions that are essentially free of volatile solvents and contain diluent molecules that react during the curing process to become a part of the protective coating itself. Although many such systems were devised, a problem often encountered by workers in this area was that these compositions were often too viscous and did not cure rapidly enough for many commercial applications. To correct this deficiency radiation-curable acrylate-capped polycaprolactone compositions, fully described in U.S. Pat. No. Re. 29,131 were devised. However these very useful composition are relatively expensive. A coating composition which has the virtues of the above-mentioned polycaprolactone compositions and is less costly would be of great advantage.

SUMMARY OF THE INVENTION

It has now been found that polycaprolactone polyols, as hereinafter defined, will react with certain allyl or vinyl compounds, and polyisocyanates, or alternatively will react with allyl or vinyl compounds which have directly attached isocyanato or thioisocyanato groups to produce allyl- or vinyl-capped polycaprolactone urethane derivatives.

It has been found that the allyl- or vinyl-capped polycaprolactone urethane derivatives of this invention can be used per se as coating compositions or they can be admixed with other compounds to produce coating compositions. As is obvious, any of the known pigments, fillers, additives, etc., ordinarily used in the production of coating compositions can be present. The coating compositions can be applied to a surface by any conventional manner and cured by the exposure to heat or radiation.

DESCRIPTION OF THE INVENTION

(1) The allyl- or vinyl-capped polycaprolactone urethane compounds

As previously indicated, the vinyl- or allyl-capped polycaprolactone urethanes of this invention can be produced by two alternative procedures. In the first procedure they are the reaction product mixtures obtained by the reaction of (A) a polycaprolactone polyol, (B) an organic polyisocyanate and (C) a reactive vinyl compound or an allyl compound, all as hereinafter defined. In the second procedure they are the reaction product mixtures obtained by the reaction of (A) a polycaprolactone polyol and (B) vinyl isocyanate or allyl isocyanate.

The polycaprolactone polyols used as starting materials are commercially known compositions of matter and are fully described in U.S. Pat. No. 3,169,945. As used in this instant specification the term polycaprolactone polyols include compounds having two or more hydroxyl groups. As described in U.S. Pat. No. 3,196,945 the polycaprolactone polyols are produced by the catalytic polymerization of an excess of the caprolactone compound with an organic functional initiator having at least two reactive hydrogen atoms; the polyols can be single compounds or mixtures of compounds, either can be used in this invention. The method for producing the polycaprolactone polyols is of no consequence. The organic functional initiators can be any hydroxyl compound, as shown in U.S. Pat. No. 3,169,945, and include diols such as ethylene glycol, diethylene glycol, triethylene glycol, 1,2-propylene glycol, dipropylene glycol, 1,3-propylene glycol, polyethylene glycol, polypropylene glycol, poly-(oxyethylene-oxypropylene) glycols and similar polyalkylene glycols, either block, capped or heteric, containing up to about 40 or more alkyleneoxy units in the molecule, 3-methyl-1, 5-pentanediol, cyclohexanediol, 4,4-methylene-biscyclohexanol, 4,4'-isopropylidenebiscyclohexanol, xylenediol,2-(4-hydroxymethylphenyl)ethanol, and the like, triols such as glycerol, trimethylolpropane,1,2,6-hexanetriol, 1,4-butanediol, triethanolamine, triisopropanolamine, and the like; tetrols such as erythritol, pentaerythritol N,N,N',N'-tetrakis(2-hydroxyethyl)ethylenediamine, and the like.

When the organic functional initiator is reacted with the caprolactone a reaction occurs that can be represented in its simplest form as follows;

$$R''(OH)_x + O=C(CR_2')_4CHR' \longrightarrow$$
$$\phantom{R''(OH)_x + }|\phantom{=C(CR_2')_4CHR'}\,|$$
$$\phantom{R''(OH)_x + }O\phantom{=C(CR_2')_4CH}\!\rule[0.5ex]{2em}{0.4pt}$$

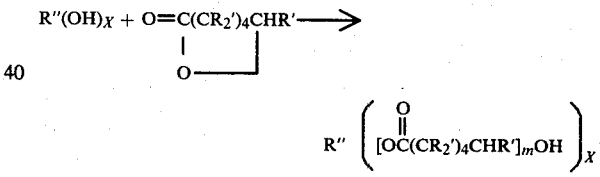

In this representation the organic functional initiator is the $R''(OH)_x$ compound and the caprolactone is the

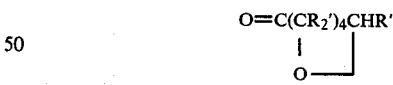

compound; this can be caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms as shown in U.S. Pat. No. 3,169,945. The polycaprolactone polyols that are used to produced the vinyl-or allyl capped polycaprolactone polyols of this invention are shown by the formula on the right-hand side of the reaction they can have an average molecular weight of from 130 to about 20,000. The most preferred are the polycaprolactone diol compounds having an average molecular weight of from about 175 to about 500 and the polycaprolactone triol compounds having an average molecular weight of from about 350 to about 1000; these are most preferred because of their low viscosity properties. In the formula m is an integer representing the average number of repeating units needed to produce the compound having said molecular weights.

The organic polyisocyanates used as starting materials are the known aliphatic and aromatic polyisocyanates such as 3,5,5-trimethyl-1-isocyanato-3-isocyanatomethylcyclohexane, di(2-isocyanatoethyl)-bicyclo[2,2,1]-hept-5-ene-2,3-dicarboxylate, 2,4-tolylene diisocyanate, 2,6-tolylene diisocyanate, 4,4-diphenylmethane diisocyanate, dianisidine diisocyanate, tolidine diisocyanate, hexamethylene diisocyanate, the m- and p-xylylene diisocyanates, tetramethylene diisocyanate, dicyclohexyl,4,4′methane diisocyanate, cyclohexane-1, 4-diisocyanate, 1,5-napthylene diisocyanate, 4,4-diisocyanate diphenyl ether, 2,4,6-triisocyanate toluene, 4,4′,4″-triisocyanate triphenyl methane, diphenylene-4,4′-diisocyanate, the polymethylene polyphenylisocyanates, as well as any of the other organic isocyanates and corresponding thioisocyanates known to the average skilled chemist. Of course, mixtures of isocyanates can be used.

The suitable reactive vinyl or allyl compounds useful as starting materials can be represented by the general formula:

CH$_2$=CH(CH$_2$)$_x$R wherein x is zero or one and R is hydroxyl, mercapto or substituted or unsubstituted hydroxyphenol or hydroxybenzyl or hydroxycycloalkyl having 5 or 6 ring carbon atoms. Illustrative thereof one can mention allyl benzyl alcohol, allyl alcohol, allylamine, allyl mercaptan, vinyl benzyl alcohol, 4-allyl-2,6-dimethoxyphenol, allyl-2-hydroxyethyl ether. 1-allyl-1-cyclohexanol, allylmethylamine, 2-vinyl-3,6-dimethylphenol, 2-allyl-3,6-dimethylphenol, 2-allyl-4-methoxyphenol, 2-allyl-4-methylphenol, 2-vinyl-4-methylphenol, 3-vinylcyclopentanol, and the like.

The vinyl-or allyl-capped polycaprolactone urethanes can be produced by any procedure desired. They are preferably produced in the absence of a solvent; however, one can, if desired, employ any organic solvent that will not unduly interfere with the reaction; e.g. benzene, toluene, hexane, acetone, methyl ethyl ketone. The reaction is carried out at a temperature of from about 30° C. to about 150° C., preferably from about 40° C. to about 75° C. In view of the known reactivity of the isocyanato group essentially anhydrous conditions are employed. One can also, if desired, employ a reactive compound as the solvent, for example the acrylate esters liquid at the reaction temperature. In such instances any of the well-known conventional inhibitors are added in the usual amount to minimize or prevent polymerization across the double bond.

In a typical reaction one can initially react the polycaprolactone polyol with the organic polyisocyanate to produce an isocyanate terminated prepolymer. This prepolymer is then reacted with the reactive vinyl or allyl compound to yield the desired vinyl-or allyl-capped polycaprolactone polyol urethane derivatives mixture. Alternatively, one can prepare a mixture of the three reactants and simultaneously react the mixture to produce the desired product.

A still further procedure involves the reaction of the polycaprolactone polyol with vinyl isocyanate or allyl isocyanate, or their respective thioisocyanates to produce a vinyl-or allyl-capped polycaprolactone urethane derivatives mixture.

In either of the procedures discussed the reaction conditions used are those previously described. Further, as is known, one can also have present any of the art recognized catalysts used in the reaction forming the urethane link.

Illustrative of polycaprolactone polyols that can be used as starting materials in this invention one can mention the reaction products of a polyhydroxyl compound having from 2 to 4 hydroxyl groups with caprolactone. The manner in which the polycaprolactone polyol compositions are produced is shown in U.S. Pat. No. 3,169,945 and many such composition are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and the polycaprolactone polyol one can readily determine the average number of molecules of caprolactone (CPL Units) that reacted to produce the compound; this figure is shown in the third column.

| Initiator | Average Molecular Weight of Polyol | Average No. of CPL Units in Molecule |
| --- | --- | --- |
| 1 ethylene glycol | 290 | 2 |
| 2 ethylene glycol | 803 | 6.5 |
| 3 ethylene glycol | 2114 | 18 |
| 4 propylene glycol | 874 | 7 |
| 5 octylene glycol | 602 | 4 |
| 6 decalene glycol | 801 | 5.5 |
| 7 diethylene glycol | 530 | 3.7 |
| 8 diethylene glycol | 850 | 6.5 |
| 9 diethylene glycol | 1246 | 10 |
| 10 diethylene glycol | 2000 | 16.6 |
| 11 diethylene glycol | 3536 | 30 |
| 12 triethylene glycol | 754 | 5.3 |
| 13 polyethylene glycol (MW 200)* | 713 | 4.5 |
| 14 polyethylene glycol (MW 600)* | 1396 | 7 |
| 15 polyethylene glycol (MW 1550)* | 2818 | 12 |
| 16 1,2-propylene glycol | 646 | 5 |
| 17 1,3-propylene glycol | 988 | 8 |
| 18 dipropylene glycol | 476 | 3 |
| 19 polypropylene glycol (MW 425)* | 824 | 3.5 |
| 20 polypropylene glycol (MW 1004)* | 1688 | 6 |
| 21 polypropylene glycol (MW 2000)* | 2456 | 4 |
| 22 hexylene glycol | 916 | 7 |
| 23 2-ethyl-1,3-hexanediol | 602 | 4 |
| 24 1,5-pentanediol | 446 | 3 |
| 25 1,4-cyclohexanediol | 629 | 4.5 |
| 26 1,3-bis(hydroxyethyl)benzene | 736 | 5 |
| 27 glycerol | 605 | 4.5 |
| 28 1,2,6-hexanetriol | 476 | 3 |
| 29 trimethylolpropane | 590 | 4 |
| 30 trimethylolpropane | 761 | 5.5 |
| 31 trimethylolpropane | 1133 | 8.5 |
| 32 triethanolamine | 890 | 6.5 |
| 33 erythritol | 920 | 7 |
| 34 pentaerythritol | 1219 | 9.5 |

*Average molecular weight of glycol.

The structures of the compounds in the above tabulation are obvious to one skilled in the art based on the information given. The structure of compound No. 7 is:

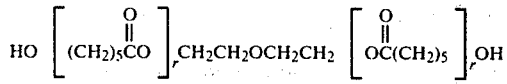

wherein the variable r is an integer, the sum of r+r has an average value of 4.3 and the average molecular weight is 527. The structure of compound No. 20 is:

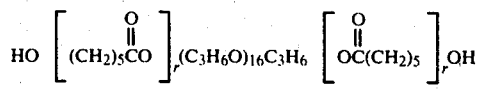

wherein the sum of r+r has an average value of 6 and the average molecular weight is 1595. This explanation makes explicit the structural formulas of compounds 1 to 34 set forth above.

The allyl- or vinyl-capped polycaprolactone urethane compounds can be illustrated by the following compounds. This tabulation is illustrative only and is not to be considered a complete tabulation of all possible compounds since other compounds are obvious in view of applicant's teachings.

solvents, pigments, fillers and other additives. They can be applied by conventional means and cured by heat or by exposure to ultraviolet light radiation, in which case a photosensitizer is present, or high energy radiation such as x-ray, gamma-ray, alpha-particles, beta-particles, and accelerated electrons.

The allyl- or vinyl-capped polycaprolactone polyols can also be used to produce coating compositions known as 100 percent solids coating compositions by mixing with reactive solvents. The reactive solvents are well known to those skilled in the art and include allyl butyl ether, allyl phenyl ether, allyl naphthalene, allyl ethyl ether, allyl chloroacetate, allyl cyclopentane, 2-allyl cyclohexanone, allyl cyclohexane propionate, allyl caproate, allyl caprylate, allyl cyclohexane, allyl pelargonate, allyl laurate, allyl phenoxy acetate, allyl propionate, vinyl acetate, styrene, alpha-methyl styrene, butyl acrylate, 2-ethylhexyl acrylate, butyl methacrylate, 2-phenylethyl acrylate, furfuryl acrylate, isobornyl acrylate, isodecyl methacrylates, and the like.

The coating compositions can contain from 0 to about 10 weight percent preferably from about 0.5 to about 1.0 weight percent of any activator such as any of the known photosensitizers or photoinitiators. These can be used singly or in mixtures and include, for exam-

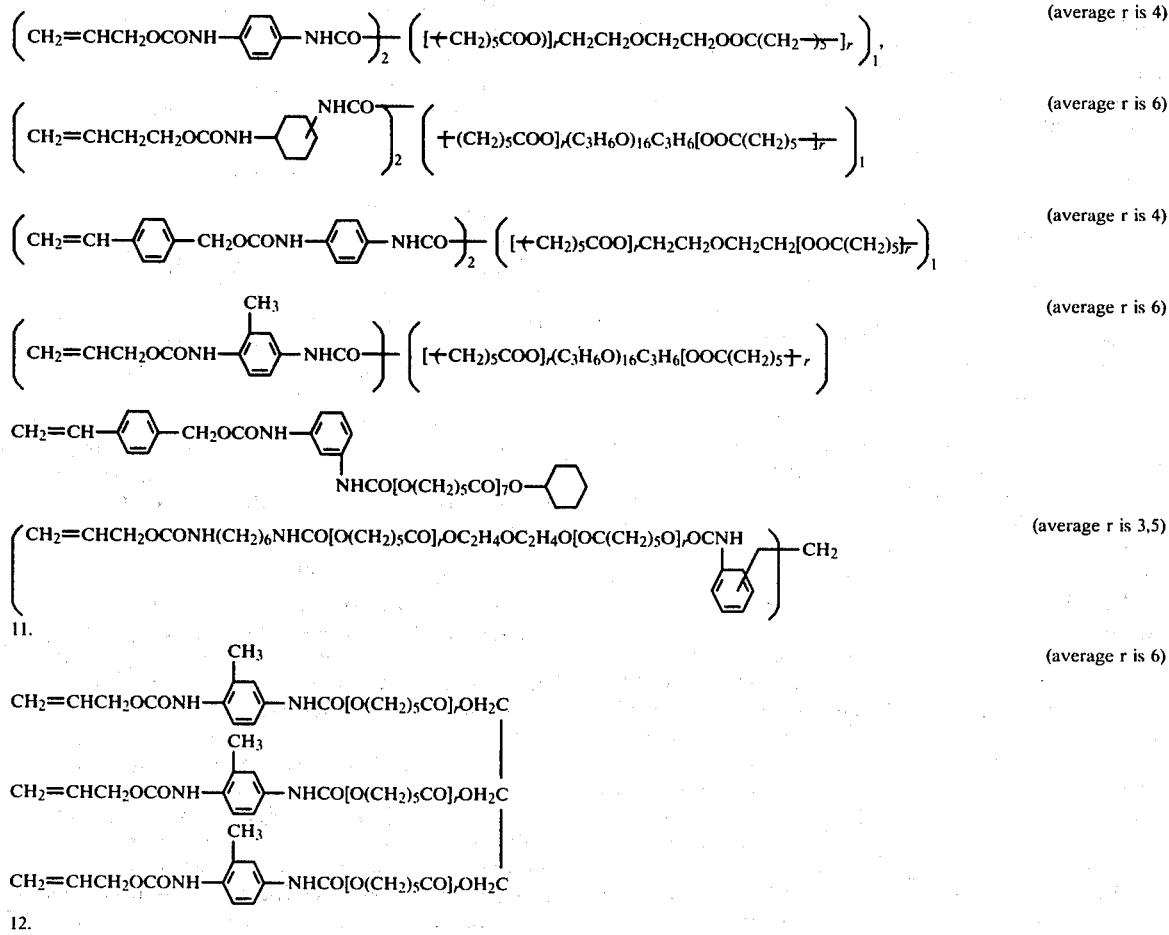

(2) THE COATING COMPOSITIONS.

The allyl- or vinyl-capped polycaprolactone urethane compounds can be used per se as coating compositions, either alone or in admixture with conventional ple, benzophenone, p-methoxybenzophenone, acetophenone, m-chloroactophenone, propiophenone, xanthone, benzoin benzil, benzaldehyde, napthoquinone, anthraquinone, di-t-butyl peroxide, dicumyl peroxide, t-butyl hydroperoxide, t-butyl peracetate, peracetic acid perbenzoic acid, benzoyl peroxide, dichlorobenzoyl peroxide, azobis (isobutyronitrile), dimethyl azobis(isobutyrate), morpholine, diethylamine, piperidine, pyrrolidine, and the like.

The coating compositons can contain from 10 to 100 weight percent of the allyl- or vinyl-capped polycaprolactone polyol urethane mixtures of this invention, preferably from 40 to 95 weight percent, most preferably from 50 to 85 weight percent. The concentration of reactive solvent can be from zero to about 90 weight percent, preferably from 5 to 60 weight percent, most preferably from 20 to 50 weight percent.

The coating compositions are produced by conventional methods by mixing the selected components together. To facilitate preparation one can apply a small amount of heat. The coatings can be applied by conventional means including spray, curtain, dip, pad, roll coating and brushing methods. The coatings may be applied to any acceptable substrate such as wood, metal, glass, fabric, paper, plastic that is in any form, e.g., sheet, coil, molded, film, panel, tube, etc.

The coating compositions containing allyl-or vinyl capped polycaprolactone polyol urethane mixtures of this invention can be cured by exposure to radiation either before or after the coating has dried. The radiation can be ultraviolet at wavelengths of from 2000 to 4000 angstrom units, or higher energy sources such as x-ray, gamma-ray, alpha-particle, beta-particle, or accelerated electrons. The slow cure rate for ultraviolet curing makes it less desirable than the higher energy sources for curing allyl-or vinyl-capped compositions. Thus, the aforementioned high energy sources are preferred, with accelerated electron beam being most preferred. The required energy dose will vary depending upon the coating composition, and to some extent, on the acceleration voltage when electron beam energy is employed. A dose of three to ten megarads is usually sufficient to cure the compositions containing the allyl- or vinyl-capped polycaprolactone polyol urethane mixtures of this invention.

In a typical embodiment, a polycaprolactone polyol, produced by the reaction of diethylene glycol, epsilon-caprolactone, and dimethylformamide as solvent is placed in a flask equipped with a stirrer, thermocouple and two dropping funnels. Dibutyltin dilaurate catalyst and phenothiazine and monomethyl hydroquinone inhibitors are added and the mixture is heated to 55° C. While the mixture is vigorously stirred, 4,4'-diphenylmethane diisocyanate is fed dropwise and the mixture was stirred and heated for 3 hours. Vinylbenzyl alcohol is then added in a dropwise manner while the mixture is stirred and heated for another 3 hours to yield the vinyl-capped polycaprolactone polyol urethane reaction product mixture of this invention. This was then mixed with 1,6-hexanediol diacrylate and applied to a glass plate as a film 5 mils thick. The film was cured by exposure to an electron beam at a 5 megarads dose having a 300 KeV acceleration voltage.

The compositions of this invention find use wherever thick or heavily pigmented coatings are used which require electron beam or other high energy sources for curing. These compositions are of great advantage in that they present the opportunity of formulating less polluting and less expensive coatings than those presently available for applications requiring high-energy curing.

It was completely unexpected and unobvious to find that the reaction product of a polycaprolactone polyol, an allyl or vinyl monomer and a polyisocyanate as herein described could be used to produce a coating composition that is readily curable to a solid protective film.

The following examples serve to further illustrate the invention.

EXAMPLE 1

A polycaprolactone polyol (26.4 grams), produced as described in U.S. Pat. No. 3,169,945 by the reaction of diethylene glycol and epsilon-caprolactone having an average molecular weight of about 2000, and 15.3 grams of dimethyl formamide were placed in a four-neck 250 ml flask that was equipped with a stirrer, thermocouple and two dropping funnels. After the addition of two drops of dibutyltin dilaurate as catalyst and 0.01 gram each of phenothiazine and monomethyl hydroquinone as inhibitors, the mixture was heated to 55° C. in an oil bath and 5.1 grams of 4,4'-diphenylmethane diisocyanate were fed dropwise over about a 40 minute period while stirring vigorously. The reaction mixture was stirred to 55° C. for about 3 hours to produce the isocyanato capped prepolymer. To the prepolymer there was added 4.2 grams of vinylbenzyl alcohol at 55° C. in a dropwise manner while stirring and the reaction was allowed to proceed for about another 3 hours. A clear yellowish, liquid vinyl-capped polycaprolactone polyol urethane reaction product mixture with a total solids content of about 70 percent was obtained having a Brookfield viscosity of 80,000 cps at 50° C.

EXAMPLE 2

In a procedure similar to that described in Example 1, 2 moles of polycaprolactone diol having an average molecular weight of 1250, 1 mole (261.3 grams) of tolylene diisocyanate, 38.7 grams of allylisocyanate, 0.18 gram of dibutylin dilaurate and 0.02 gram of monomethyl hydroquinone were heated at 60° C. for 4 hours. Since no reaction was observed during this period, the temperature was raised to 90° C. and kept there for about 8 hours. There was produced a light brown liquid allyl-capped polycaprolactone polyol urethane reaction product mixture having a Brookfield viscosity of 486,000 cps at room temperature and 47,000 cps at 50° C.

EXAMPLE 3

In a procedure similar to that described in Example 1, a solution of 442.4 grams of the same polycaprolactone polyol used in Example 2 in 185 grams of toluene was reacted with 63.4 grams of tolylene diisocyanate at 60° C. for about four hours; 0.025 grams of monomethyl ether hydroquinone, and 0.3 grams of dibutyltin dilaurate were also present. At the end of this time, 45.65 grams of 2-allylphenol was added in a dropwise manner over a 30 minute period. The mixture was stirred an additional three hours at 60° C. A light yellow, liquid allyl-capped polycaprolactone polyol urethane reaction product mixture was obtained having a Brookfield viscosity of 350,400 cps at 25° C. and 64,000 cps at 50° C.

EXAMPLE 4

Fourteen grams of the polycaprolactone polyol urethane reaction product produced in Example 1 and 1 gram of 1,6-hexanediol diacrylate were mixed to form a homogenous coating mixture. This coating was applied to a glass plate as a 5-mil film and cured by electron beam radiation using a 5 megarads dose and 300 KeV acceleration voltage. The average tensile strength of the cured film was 1,302 psi and the average elongation at break was 64 percent. The tensile measurement was made on a stress-strain testing machine, employing the gage length of 1 inch and the crosshead speed of 1 inch per minute. The test specimen measured 0.25 inch by 4 inches.

What is claimed is:

1. An allyl- or vinyl-capped polycaprolactone polyol urethane reaction product mixture comprising (I) the reaction product of the group consisting essentially of:
   A. a polycaprolactone polyol having from 2 to 6 hydroxyl groups and an average molecular weight of from about 130 to about 20,000:
   B. an organic polyisocyanate; and
   C. a reactive vinyl or allyl compound of the formula:

$$CH_2=CH(CH_2)_xR$$

wherein x is zero or one and R is hydroxyl, mercapto, or substituted or unsubstituted hydroxyphenol or hydroxybenzyl or hydroxycycloalkyl having 5 or 6 ring carbon atoms;

or (II) the reaction product of:
   A. a polycaprolactone polyol as defined above; and
   B. vinyl isocyanate or allyl isocyanate or the respective thioisocyanates thereof.

2. A vinyl-capped polycaprolactone polyol urethane reaction product mixture as claimed in claim 1, comprising the reaction product mixture of a polycaprolactone polyol produced by the reaction of diethylene glycol and epsilon-caprolactone, 4,4'-diphenylmethane diisocyanate and vinylbenzyl alcohol.

3. An allyl-capped polycaprolactone polyol urethane reaction product mixture as claimed in claim 1, comprising the reaction product of a polycaprolactone polyol produced by the reaction of diethyleneglycol and epsilon-caprolactone, tolylene diisocyanate and allyisocyanate.

4. An allyl-capped polycaprolactone polyol urethane reaction product mixture as claimed in claim 1, comprising the reaction product of a polycaprolactone polyol produced by the reaction of diethyleneglycol and epsilon-caprolactone, tolylene diisocyanate and 2-allylphenol.

* * * * *